United States Patent
Mathis et al.

(10) Patent No.: US 7,405,184 B2
(45) Date of Patent: *Jul. 29, 2008

(54) ANTI-TRACTION, MOBILITY DENIAL METHODS AND PRODUCTS

(75) Inventors: Ronald J. Mathis, San Antonio, TX (US); Mary C. Marshall, San Antonio, TX (US); Nicholle K. Reinhardt, San Antonio, TX (US); Errol M. Brigance, San Antonio, TX (US); Geronimo I. Elias, Jr., Lytle, TX (US); Kenneth R. Collins, Belcamp, MD (US)

(73) Assignee: Southwest Research Institute, San Antonio, TX (US)

( * ) Notice: Subject to any disclaimer, the term of this patent is extended or adjusted under 35 U.S.C. 154(b) by 349 days.

This patent is subject to a terminal disclaimer.

(21) Appl. No.: 10/727,615

(22) Filed: Dec. 5, 2003

(65) Prior Publication Data

US 2004/0151909 A1 Aug. 5, 2004

Related U.S. Application Data

(63) Continuation-in-part of application No. 10/315,208, filed on Dec. 10, 2002, now Pat. No. 7,067,464.

(60) Provisional application No. 60/338,654, filed on Dec. 11, 2001.

(51) Int. Cl.
*C10M 173/00* (2006.01)
*C10M 149/06* (2006.01)

(52) U.S. Cl. ............... 508/471; 508/469; 508/507; 106/36; 106/287.25; 428/403

(58) Field of Classification Search ........... 508/471; 106/36, 285, 287.25
See application file for complete search history.

(56) References Cited

U.S. PATENT DOCUMENTS

| | | | |
|---|---|---|---|
| 3,562,193 A | 2/1971 | Leeks et al. .............. 260/4 |
| 3,983,213 A | 9/1976 | Lissant | |
| 4,069,186 A | 1/1978 | Ramig .................... 260/29.6 |
| 4,450,197 A | 5/1984 | Hager et al. ............... 428/232 |
| 4,493,777 A * | 1/1985 | Snyder et al. ............... 508/472 |
| 4,541,947 A | 9/1985 | Clark et al. | |
| 4,604,411 A * | 8/1986 | Yada et al. ................. 522/14 |
| 4,606,834 A * | 8/1986 | Hart et al. ................. 508/471 |
| 4,606,913 A | 8/1986 | Aronson et al. | |
| 4,650,596 A * | 3/1987 | Schlueter et al. ........... 508/471 |
| 4,673,516 A | 6/1987 | Berry | |
| 4,781,847 A | 11/1988 | Weitz | |
| 5,171,781 A * | 12/1992 | Farrar et al. ................ 524/547 |
| 5,209,860 A | 5/1993 | Trivett | |
| 5,258,424 A | 11/1993 | Yagi et al. ................. 523/221 |
| 5,338,129 A | 8/1994 | Oden | |
| 5,384,343 A * | 1/1995 | Farrar et al. ................ 523/129 |
| 5,470,498 A | 11/1995 | Pialet et al. | |
| 5,639,796 A | 6/1997 | Lee | |
| 5,834,553 A * | 11/1998 | Roberts et al. ............. 524/577 |
| 5,962,578 A * | 10/1999 | Beihoffer et al. ........... 524/521 |
| 6,031,041 A | 2/2000 | Chung et al. | |
| 6,034,041 A | 3/2000 | Nittel et al. | |
| 6,242,489 B1 | 6/2001 | Pinney | |
| 6,271,184 B1 * | 8/2001 | Seebauer et al. ........... 508/469 |
| 6,642,351 B1 * | 11/2003 | Harlukowicz et al. ... 528/502 R |
| 6,689,200 B2 * | 2/2004 | Scarborough et al. ......... 106/2 |
| 6,784,141 B1 * | 8/2004 | King et al. ................ 507/222 |
| 7,067,464 B2 * | 6/2006 | Mallow et al. ............. 508/551 |

FOREIGN PATENT DOCUMENTS

| | | |
|---|---|---|
| DE | 1 644 976 | 10/1971 |
| DE | 25 54 082 A1 | 6/1977 |
| EP | 0 041 834 B1 | 8/1984 |
| EP | 0 341 577 A3 | 9/1990 |
| EP | 1 160 299 A1 | 12/2001 |
| FR | 2 753 986 A1 | 4/1998 |
| GB | 1 312 083 | 4/1973 |
| GB | 1 562 417 A | 3/1980 |
| JP | 02042351 A2 | 2/1990 |
| JP | A-6-293875 A | 10/1994 |
| WO | WO 91/15434 | 10/1991 |
| WO | WO 92/07924 | 5/1992 |
| WO | WO 98/51731 | 11/1998 |
| WO | WO 03/050192 A1 | 6/2003 |

OTHER PUBLICATIONS

Cytec Industries Inc.: "Superfloc Dry Polyacrylamide (PAM), anionic: A-100 Series" Aug. 8, 2003, XP002301616.

* cited by examiner

*Primary Examiner*—Ellen M. McAvoy
(74) *Attorney, Agent, or Firm*—Grossman Tucker et al.

(57) ABSTRACT

The present invention relates to a lubricious anti-traction material for effectively denying the mobility and access of personnel and vehicles to selected areas. The anti-traction material includes an acrylic polymer particle mixed with water.

21 Claims, No Drawings

ANTI-TRACTION, MOBILITY DENIAL METHODS AND PRODUCTS

CROSS-REFERENCE TO RELATED APPLICATIONS

This application claims priority as a continuation-in-part of U.S. patent application Ser. No. 10/315,208 entitled AN EASILY DISPENSED, ANTI-TRACTION, MOBILITY DENIAL SYSTEM filed on Dec. 10, 2002, which claims the benefit of U.S. Provisional Application Ser. No. 60/338,654, filed Dec. 11, 2001. The content of each of the above identified applications is incorporated herein by reference in its entirety.

The U.S. Government has a paid-up license in this invention and the right in limited circumstances to require the patent owner to license others on reasonable terms as provided by the terms of U.S. Government Contract No. V674P-2995. Delivery Order No. 674-W10091, and U.S. Government Contract No. M67854-02-D-1087, Delivery Order No. 0001, awarded by the United States Marine Corps.

BACKGROUND OF THE INVENTION

1. Field of Invention

The present invention relates to anti-traction, mobility denial methods and products.

2. Description of Related Art

Crowd and riot control is a concern for law officials at every level of government: local, national and international. Attempts at controlling unruly gatherings and defending selected areas from such crowds have resulted in physical and psychological injury to members of the law community and the crowds alike.

Typical attempts of crowd control often depend upon brute physical force to subdue and disperse crowds. Such physical force includes batons, rubber bullets, water cannons, kinetic energy rounds and the like. Such physical force has resulted in injuries to both crowd members and law enforcement officials, despite the use of riot gear or protective clothing, and often does not disperse unmanageable crowds.

Typically, disruptive riots occur on public streets or guarded prisons, wherein additional participants gather as the crowd moves towards its main objective. Dispersing such crowds and limiting forward movement without the use of physical force is highly desired.

Non-lethal weapon systems now represent an important alternative for law enforcement officials and strategic defense purposes. Examples of non-lethal weapons include, but are not limited to, tear gas, flash grenades, acoustic guns, sticky foams, snare nets, stun guns, strobe lights, malodorants, etc.

In order to ensure the most desirable outcome in managing crowd control, it is desired that numerous alternatives to non-lethal weapons systems be available along a force continuum, such that a non-lethal weapon suitable for a particular application may be selected based upon the nature of the threat and level of provocation.

In the case of slowing and/or eliminating the forward progress of rowdy crowds, several non-lethal controls have been utilized. These controls range from barriers, tear gas, malodorants, sticky foams, etc. However, these typical non-lethal controls have disadvantages. For instance, crowd barriers can be bulky, require advance planning to move them into place, require large storage areas when not in use, and can be destroyed or used as weapons by the crowd members, etc. Typical barriers may also be besieged by vehicles driven by crowd members. Crowd controls such as tear gas and malodorants, although non-lethal, may still cause physiological and/or psychological injury to both law enforcement agents and crowd members. Further, tear gas and malodorants may not impede forward progress of determined rioters. Finally, sticky foams may be difficult to remove once the crowd has dispersed.

SUMMARY OF THE INVENTION

In view of the above, a non-lethal impedance for crowd movement is desired that does not require much storage space and can be moved into place with minimal forethought. A crowd control means is desired that impedes not only the movement of crowds on foot, but also crowds in motorized vehicles. Such a crowd control means should not induce significant physiological or psychological injury, nor be able to be used by the crowds against the law enforcement officials. Further, the crowd control means should cause little, if any, damage to the surrounding environment, and be easily removed once the crowd has been subdued and/or dispersed.

This invention provides methods and products that may be used to effectively deter the mobility and access of personnel and/or vehicles to areas that are to be defended or protected. For example, a lubricious anti-traction material may be quickly and easily applied for the control of crowds, riots, defense of positions (e.g., military applications) and the like, to deter the mobility and access of personnel and vehicles to restricted and/or defended areas.

This invention also provides methods and products that may be used to immobilize hostile crowds and to enable authorities to constrain and apprehend unauthorized participants if desired.

In various exemplary embodiments, an anti-traction material may include at least a plurality of polymer particles and water or the like. Alternatively, the anti-traction material may include a plurality of acrylic copolymer particles and water or the like substance.

In various alternative exemplary embodiments, the anti-traction material may include at least a plurality of acrylic polymer particles and glycerol. In various further alternative exemplary embodiments, the anti-traction material may include at least a plurality of acrylic polymer particles and oil, such as canola oil or soybean oil.

Water or a like substance, or alternatively glycerol or oil, may be combined with the plurality of acrylic polymer or copolymer particles immediately prior to application of the plurality of acrylic polymer or copolymer particles to a targeted surface. Alternatively, water, or alternatively glycerol or oil, and the acrylic polymer or copolymer particles forming the anti-traction material may be applied to a targeted surface as two distinct materials.

The anti-traction material may produce a very coherent, visco-elastic gel that resists vertical slump and displacement by gravitational forces and forces of foot and vehicle traffic.

The anti-traction material may provide for improved performance on target surfaces, reductions in logistics support requirements, increased shelf life, and potential reductions in material costs over previous anti-traction material compositions.

DETAILED DESCRIPTION OF PREFERRED EMBODIMENTS

An anti-traction material composition may be formed of two components: (1) a polymer particle (Component 1), such as, for example, an acrylic polymer particle, and (2) water or the like substance, or alternatively glycerol or oil, as Component 2. The following discusses in detail the two components, as well as preferred ratios of these two components in the anti-traction material composition.

Component 1 may be an acrylic polymer particle, preferably an anionic acrylamide polymer powder, an acrylate polymer, and co-polymers of polyacrylamides, polyacrylates, and polyacrylic acids (especially in an anionic form). Component 2 may be water or the like substance, or alternatively glycerol or oil. Component 1 may be combined with Component 2 to produce an anti-traction material composition.

Upon hydration, the viscosity of Component 1 increases to form a gel-like substance. Typical properties of Component 1 include its "stickiness," "viscoelasticity," i.e., its ability to return to its original shape after being displaced, its rapid gel time, and the fact that the polymer chains relax and swell upon hydration. Examples of preferred Component 1 polymers include SUPERFLOC A-120, SUPERFLOC A-130, and SUPERFLOC A-150 HMW, all of which are anionic polyacrylamide flocculants from Cytec Industries. Another example is MAGNAFLOC 1011, a high molecular weight anionic polvacrylamide flocculant from Ciba Specialty Chemicals.

In various exemplary embodiments, Component 1 may be granular solids that range from about 0.05 millimeters (mm) to about 0.5 mm in size. Preferably, for optimum performance, in an exemplary embodiment, the solid polymer particle should be ground or milled to a mean size of less than about 0.425 mm.

Component 2 in the anti-traction material composition may be water or the like substance, or alternatively glycerol or oil. In various exemplary embodiments, the water, or alternatively glycerol or oil, is preferably added to the dispensing polymer particles/powder en route to the targeted surface at a preferred ratio of about 8 parts water to about one part polymer particles/powder (by weight). In various exemplary embodiments, water, or alternatively glycerol or oil, can be added to the polymer particles/powder in ratios ranging from as little as about 7 parts water, or alternatively glycerol or oil, to one part polymer particles/powder to ratios as high as about 16 parts water, or alternatively glycerol or oil, to one part polymer particles/powder.

As Component 1, for example, the acrylic particle powder, becomes hydrated, the swollen particles greatly limit mobility. Unlike wet ice, it is more difficult to adjust one's stride or velocity to prevent slipping and falling, regardless of footwear or treaded tires, especially on hard or compacted surfaces. On uncompacted surfaces and soils, cleated shoes, steel studded tires or tank treads may be able to possibly penetrate the film to a more trackable and passable and maneuverable condition, but not without considerable difficulty and not without still having the progress significantly impaired due to the slippery conditions imparted by the anti-traction material.

When applied to hard surfaces, such as, for example, asphalt, concrete and compacted soils, the combined water and swollen Component 1 particles are very effective in preventing mobility and access to controlled sites regardless of speed, footwear or vehicle wheel structures. The anti-traction material may be equally effective on flat and sloping surfaces, as well as on grassy terrain, either mowed or heavily vegetated.

The anti-traction material composition is preferably made by combining Component 1, for example, the polymer particle, with Component 2, for example water, at the time of application to a targeted surface. Alternatively, Component 1, for example, the acrylic polymer or copolymer particles, and Component 2, for example water, may be applied to a target surface as two distinct materials, and allowed to gel on the target surface, provided they are applied at the correct mixing ratio. For example, Component 2 (e.g., water) may be first applied to the target surface and then, Component 1 (e.g., polymer powder) may be applied to the already wet target surface. Next, Component 2 (e.g., water) may be once again applied to the wet target surface having Component 1 (e.g., polymer powder). One of the performance advantages observed by the inventors when the anti traction material was applied in this manner was that the anti-traction material gelled much quicker, thereby reducing the time from application to operational readiness.

The anti-traction material may also comprise other components added into either the Component 2 (e.g., water) and/or as a separate component as desired and/or needed. For example, malodorants, other noxious chemicals, colorants (e.g., to camouflage the material), etc. can also be added to the anti-traction material composition. Preferably, such additional components are included in amounts that are effective without destroying the lubricious and/or stickiness properties of the anti-traction material. However, slight reductions in lubriciousness may be tolerated. It is also preferred that the additional components not destroy the environmental friendliness of the anti-traction material.

When the anti-traction material composition is applied to smooth non-porous surfaces such as concrete or tile, Component 2 (e.g., water, glycerol, oil) may be added at a ratio of about 8 parts of water to about 1 part of Component 1 (e.g., acrylic polymer particle powder) (by weight). Alternatively, when the anti-traction material composition is applied to rough, porous surfaces, the preferred ratio ranges from about 10 parts of Component 2 (e.g., water, glycerol, oil) to about 1 part of Component 1 (e.g., acrylic polymer particle powder) (by weight) on asphalt to about 16 parts of Component 2 (e.g., water, glycerol, oil) to about 1 part of Component 1 (e.g., acrylic polymer particle powder) (by weight) on grass.

Component 2 (e.g., water, glycerol, oil) and Component 1 (e.g., acrylic polymer particle powder) may be combined/mixed together immediate prior to application to a targeted surface. If Component 2 (e.g., water, glycerol, oil) is mixed with Component 1 (e.g., acrylic polymer particle powder) in the delivery system prior to dispensing, gellation and/or clogging of the parts of the delivery system most likely will occur. Since Component 2 (e.g., water, glycerol, oil) and Component 1 (e.g., acrylic polymer particle powder) should be kept separated until dispensed, a mixing nozzle may be required that allows the two material streams to be mixed together at an exit point of the nozzle. As noted above, Component 2 (e.g., water, glycerol, oil) may also be mixed with Component 1 (e.g., acrylic polymer particle powder) after Component 1 (e.g., acrylic polymer particle powder) has been applied to a targeted surface that has been pre-wetted with Component 2 (e.g., water, glycerol, oil). This approach is especially useful when destruction of the surface, for example, asphalt runway, road, is desirable.

There are several means by which the anti-traction material may be delivered for use on hard surfaces. The anti-traction material can be pumped, sprayed, poured or even air-dropped to the desired location. In one embodiment, once the Component 1 and Component 2 are mixed together, the anti-traction property takes effect. The required thickness of the applied anti-traction material depends on several factors including the type of surface that it is being applied to, such as, for example, asphalt, wood, concrete, grass and the like, the surface temperature, and the porosity of the surface. For example, for the anti-traction material to be effective on asphalt, a minimum thickness of about 0.030" may be applied, whereas on tile, a minimum thickness of about 0.009" may be applied.

The duration of applied anti-traction material may be a function of at least the target surface temperature, the humidity, the target surface's water permeability and the thickness of the anti-traction material applied to the surface. In various exemplary embodiments, the time duration for which the anti-traction material mixture of Component 1 and Component 2 retains its properties and characteristics, and thus its effectiveness, ranges from about thirty minutes (from the material's initial application) at about 100° F. to about four hours (from the material's initial application) at about 80° F. on a porous concrete surface.

Various oils, such as, for example, soybean oil, vegetable oil, canola oil and the like, may also be added to the polymer and water solution (when Component 2 is water) to increase the duration of the applied anti-traction material. Because the oil generally floats to the top of the mixture, it reduces the water evaporation rate in the anti-traction material composition mixture, when Component 2 is water.

The anti-traction material may be used to slow or hinder the forward movement of others in several ways. First, the anti-traction material may be positioned in or around an area into which one desires to keep others from entering. It is preferred that in such circumstances that the anti-traction material be positioned on hard surfaces such as concrete, asphalt, compacted soils, etc.

When the anti-traction materials are positioned on such surfaces, one finds it extremely difficult, if not impossible, to enter into the restricted area over or through the anti-traction material because a person or vehicle is unable to obtain any traction or friction with the anti-traction material. As such, the person is unable to propel in any direction, forward, back, etc., since the force of friction between the body and the anti-traction material is so minute.

In addition to disrupting the motion of a person, the anti-traction material obstructs motor and other, land-based vehicles from entering a restricted/defended area. Like the person on foot unable to propel himself because the force of friction is so minute between his body and the anti-traction material, a land-based vehicle is also unable to gain traction and cannot move through or over the anti-traction material. A material is deemed "untrafficable," or not navigable if the material has a coefficient of friction less than about 0.05. For example, as a comparison, ice has a coefficient of friction of about 0.05.

Treads, regardless of the footwear or tires, do not overcome the anti-traction material wherein the anti-traction material is on a hard surface, e.g., concrete, asphalt, compacted soil, thus obstructing the movement of both persons and land-based vehicles.

It has been found that propelling oneself or another to "slide over" the anti-traction material may also result in the propelled person and/or object being coated with the anti-traction material. Thus, even if the propelled person or vehicle is able to advance through the anti-traction material application area, the person and/or vehicle may still find it difficult to maneuver thereafter as the anti-traction material coating still on the person/vehicle may continue to hinder movement and/or grasping or holding of objects. This is especially true since the anti-traction material is not easily removed from the person or vehicle when the material is wet with Component 2.

It is also not advantageous to build a "bridge" over the anti-traction material by laying materials, e.g., boards, other persons, etc., over the anti-traction material because the bridge materials will tend to slide out of position as the person/vehicle tries to cross over the bridge. If the bridge materials are not secured to an area not coated with the anti-traction material, the bridge materials will be forced to move in a direction opposite the force exerted by a person/vehicle moving across the bridge materials. This is because the person crossing the bridge must push off the bridge materials to move forward. However, if the bridge materials are not secured to an area not coated with the anti-traction material, the movement of the person/vehicle crossing the bridge will push the bridge materials away.

If the anti-traction material is dispensed on uncompacted surfaces, i.e., loose soils, there is a higher probability that a person and/or land vehicle might be able to gain enough traction depending on the tread of the footwear or tires. However, the material still hinders the person/vehicle's movement, albeit to a less significant degree than it would otherwise, but is still useful in limiting the movement of the person/vehicle.

The anti-traction material is not limited only to use on horizontal hard surfaces to impede movements by foot or by land vehicle. The anti-traction material may also be applied to sloped and/or vertical structures and regions due, in part, to the high cohesiveness of the material.

The anti-traction material may be most effective when it is distributed in a random pattern over a surface, thereby creating slippery and non-slippery surfaces. Such a random dispersement makes people even less sure of their steps if they attempt to cross the coated surface. This also reduces the effectiveness of people from running and sliding across the anti-traction material because of the randomness of the application and the carryover of material from a treated area to an untreated area via people's footwear.

The anti-traction material may further be placed on the surfaces of devices to keep others from utilizing them. For example, one could place a coating of the anti-traction material on windows, doorknobs, railings, stairways, entryways, etc. to restrict someone from entering or leaving an area.

The anti-traction material is particularly effective in preventing the scaling of walls and stairwells and makes doorknobs and railings impossible to grip. If sprayed on weapons, steering columns, tools and the like, their utility is impaired. Exceptional effort may be required to remove the anti-traction material through hot water or high-pressure washing with copious amounts of water, for example.

The material can be removed if desired, for example, after accomplishing the goal of the use, by high-pressure water, hot or cold, and displaced from the targeted areas to peripheral sights. It dries to a sweepable film, but can be easily reconstituted to its original anti-traction state by reapplication of Component 2 (e.g., water) thereto.

Among other things, the anti-traction, mobility denial methods and products provide:

(a) a mixture of a polyacrylamide or polyacrylate polymer or copolymer solid particle which, when mixed with water, forms a highly viscous, lubricious, displacement-resistant film that adheres to vertical and horizontal surfaces;

(b) a polymer with a mean particle size of less than about 0.5 mm and preferable about 0.425 mm that provides area coverage increases over a polymer of larger size;

(c) a water-activated gel which provides a non-displaceable, stable film/coating that impedes or prevents foot and vehicular traffic at all speeds;

(d) an environmentally friendly mixture that is non-hazardous and can be left on the target surface for long durations while remaining effective;

(e) a mixture that provides a means of peeling or removing the top layer(s) of asphalt or concrete;

(f) a renewable anti-traction coating which, after drying, can be restored to its original function by the application of water;

(g) a mobility denial mixture that can be pumped, sprayed, poured, or air-dropped to the desired target areas;

(h) a coating that can be applied to walls, doors, windows, railings, steps, floors, walkways, streets, grass, concrete, asphalt, tile or packed earth surfaces to impede or prevent movement of personnel or vehicles;

(i) a highly viscous, lubricious gel that can render tools, weapons, and any hand-operated device difficult or impossible to operate;

(j) a highly tenacious, lubricious coating that requires extraordinary means to remove: high-pressure water, with or without heat;

(k) an anti-traction material, with the addition of oil, will have an increased duration of effects due to the reduced evaporation rate of water provided by the oil.

(l) an anti-traction material that, with the addition of a surfactant, will repel water from porous surfaces, which will in turn extend the material's duration of effects;

(m) an anti-traction material that, with the addition of acids and salts, will have a reduced vapor pressure that will in turn extend the material's duration of effects;

(n) a single component polymer that reduces cost and logistics; and (o) a dry polymer that does not significantly degrade after years of storage via hydrolysis or other reaction.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A coating comprising:
polymer particles selected from the group consisting of acrylic polymer, polyacrylates, polyacrylamides, polyacrylic acids, and copolymers thereof, wherein said polymer particles have a mean particle size of less than about 0.5 mm to about 0.425 mm; and
water, wherein said water hydrates and swells said polymer particles and forms an anti-traction material in the form of a viscous gel coating and wherein a ratio of water to said polymer particles ranges from 7:1 to 16:1 by weight.

2. The coating according to claim 1, wherein the coating, after drying, is capable of being restored to an anti-traction material upon application of additional water.

3. The coating according to claim 1, wherein a ratio of water to said polymer particles is about 8:1 by weight.

4. The coating according to claim 1, wherein said coating is capable of being dispensed on and adhering to horizontal, sloping or vertical surfaces.

5. The coating according to claim 1, further comprising additives selected from the group consisting of malodorants, chemicals, colorants, and mixtures thereof.

6. A method of reducing mobility over a target surface comprising:
mixing polymer particles and water in a ratio based on, at least in part, a type of said target surface to form an anti-traction material in the form of a viscous gel coating, wherein said polymer particles are selected from the group consisting of acrylic polymers, polyacrylates, polyacrylamides, polyacrylic acids, and copolymers thereof and have a mean particle size of about 0.01 to 0.5 mm, wherein said ratio of water to said polymer particles ranges from 7:1 to 16:1 by weight;
coating at least a portion of said target surface with said anti-traction material at a thickness based on, at least in part, said type of said target surface to reduce mobility over said portion of said target surface.

7. The method according to claim 6, wherein a ratio of water to said polymer particles is about 8:1 by weight.

8. The method of claim 6, comprising pre-wetting said target surface, dispensing said polymer particles to said target surface, and adding said water to said polymer particles on said target surface.

9. The method according to claim 8, wherein a ratio of water to said polymer particles is about 8:1 by weight.

10. A coating comprising polymer particles selected from the group consisting of acrylic polymers, polyacrylates, polyacrylamides, polyacrylic acids, and copolymer thereof, wherein said polymer particles have a mean particle size of less than about 0.5 mm to about 0.425 mm and one of glycerol or oil to provide an anti-traction material in the form of a viscous gel coating and wherein a ratio of glycerol or oil to said polymer particles ranges from 7:1 to 16:1 by weight.

11. The coating according to claim 10, wherein a ratio of glycerol or oil to said polymer particles is about 8:1 by weight.

12. The coating according to claim 10, wherein said coating of said anti-traction material is capable of being dispensed on and adhering to horizontal, sloping or vertical surfaces.

13. The coating according to claim 12, wherein said surfaces include one or a plurality of concrete, tile, asphalt, grass, wood, soil, floors, walkways, roads, runways, windows, doorknobs, railings, steps, stairways, entryways, walls, weapons, steering columns, or tools.

14. The coating according to claim 4, wherein said surfaces include one or a plurality of concrete, tile, asphalt, grass, wood, soil, floors, walkways, roads, runways, windows, doorknobs, railing, steps, stairways, entryways, walls, weapons, steering columns or tools.

15. The coating according to claim 1, wherein said polymer particles are in anionic form.

16. The coating according to claim 10, further comprising additives selected from the group consisting of malodorants, chemicals, colorants, and mixtures thereof.

17. The coating according to claim 10, wherein said polymer particles are in anionic form.

18. The method according to claim 6, wherein said type of said target surface is selected from the group consisting of concrete, tile, asphalt, grass, wood, soil, floors, walkways, roads, runways, windows, doorknobs, railings, steps, stairways, entryways, walls, weapons, steering columns, and tools.

19. The method according to claim 6, wherein said polymer particles and said water are mixed immediately prior to applying to said target surface.

20. The method of claim 6, wherein said thickness of said coating of said anti-traction material is between about 0.009 inches to about 0.030 inches.

21. The coating according to claim 10, wherein said thickness of said coating of said anti-traction material is between about 0.009 inches to about 0.030 inches.

* * * * *